United States Patent
Aupperle

(10) Patent No.: US 6,471,437 B1
(45) Date of Patent: Oct. 29, 2002

(54) VARIABLY MOUNTABLE PROFILED BAR FOR USE AS A COLUMN, BRACKET, TIE-BAR, STRUT OR THE LIKE FOR DEVICES

(75) Inventor: Bernd Aupperle, Waiblingen (DE)

(73) Assignee: Robert Bosch GmbH, STuttgart (DE)

(*) Notice: Subject to any disclaimer, the term of this patent is extended or adjusted under 35 U.S.C. 154(b) by 0 days.

(21) Appl. No.: 09/856,007

(22) PCT Filed: Oct. 5, 1999

(86) PCT No.: PCT/DE99/03196

§ 371 (c)(1),
(2), (4) Date: May 16, 2001

(87) PCT Pub. No.: WO00/29691

PCT Pub. Date: May 25, 2000

(30) Foreign Application Priority Data

Nov. 16, 1998 (DE) .............................. 198 52 673

(51) Int. Cl.⁷ .............................. E04C 3/06; E04B 1/58
(52) U.S. Cl. ........................................ 403/238; 403/335
(58) Field of Search .................. 403/238, 230, 403/231, 263, 264, 331, 336, 335

(56) References Cited

FOREIGN PATENT DOCUMENTS

| DE | 22 41 787 A | 3/1974 |
|---|---|---|
| DE | 36 20 379 A1 | 12/1987 |
| DE | 89 03 813.4 | 6/1989 |
| DE | 89 01 539 U | 8/1990 |
| DE | 40 11 252 | 10/1990 |
| DE | 92 03 467 U | 6/1992 |
| DE | 91 10 995.7 | 2/1993 |
| DE | 94 04 102 U1 | 8/1995 |
| FR | 1 098 268 A | 7/1955 |
| FR | 1 588 281 A | 4/1970 |
| FR | 2 748 084 A | 10/1997 |
| GB | 2 135 008 A | 9/1984 |

OTHER PUBLICATIONS

Bosch: Mechnik Grundelemente M 1996 XP0022094146, pp. 6–13.
Katalog Mechanik–Grundelemente (Catalogue of Mechanical Engineering—Basic Elements), Edition 7.0, Robert Bosch GmbH, Stuttgert, Germany, Aug. 1997.

*Primary Examiner*—Christopher J. Novosad
(74) *Attorney, Agent, or Firm*—Michael J. Striker

(57) ABSTRACT

A variably mountable profile bar (10, 10') for use as a column, boom, cross member, strut, or the like for devices (30) is proposed. The profile bar (10, 10') is made of aluminum and, along two opposite side surfaces (12), has respective anchoring grooves (14) with a groove cross sectional area $A_N$. A hollow channel (16) for electrical an pneumatic lines is embodied in the longitudinal direction. The hollow channel has a channel cross sectional area $A_K$. The material of the profile bar (10, 10') has a material cross sectional area $A_M$. The profile bar (10, 10') is characterized in that at least in sections, the ratio of the groove cross sectional area $A_N$ and the channel cross sectional area $A_K$ to the material cross sectional area $A_M$ is between 0.1 and 0.8. As a result, the profile bar (10, 10') is rigid and can be processed in a processing machine, as a result of which narrow tolerances can be achieved.

16 Claims, 4 Drawing Sheets

VARIABLY MOUNTABLE PROFILED BAR FOR USE AS A COLUMN, BRACKET, TIE-BAR, STRUT OR THE LIKE FOR DEVICES

BACKGROUND OF THE INVENTION

The invention relates to a variably mountable profile bar for use as a column, boom, cross member, strut, or the like for devices. A profile bar of this kind is known, for example, from the Katalog Mechanik-Grundelemente [Catalogue of Mechanical Engineering—Basic Elements], edition 7.0, pp. 2–22 Robert Bosch GmbH, Stuttgart, D E. The profile bar is made of aluminum and along at least one side surface, has at least one anchoring groove with a groove cross sectional area $A_N$. At least one hollow channel is embodied in the longitudinal direction, with a channel cross sectional area $A_K$. The material of the profile bar has a relatively sleight remaining material cross sectional area $A_M$. As a result, the profile bar is not very rigid, as a result of which it cannot be properly clamped to a milling machine because it can bend as a result. This is disadvantageous for precise machining processes. This in turn leads to the profile bar not being well suited for use in designs which require high precision. This is important, for example, in special purpose machine engineering.

For this reason, steel pipes are frequently used which are as a rule more rigid with the same structural size. But these have the disadvantage that they are heavier and frequently have to be welded, which requires costly individual construction. If the surfaces are sandblasted, then fibers are left adhering to these surfaces after cleaning. However if the surfaces are burnished, then they rust. In addition, after installation, signs or other installation elements must frequently be attached by means of bores, as a result of which shavings fall into nearly completed machines. Screw bores are frequently not optimally sealed, which in wet stations, can lead to the fact that mediums such as gasoline or diesel drip during operation.

In addition to the profile bar described above, hydraulic or pneumatic cylinders with extruded cylinders are also used in actual practice. But these are not additionally used as variably mountable profile bars for use as a column, boom, cross member, strut, or the like for devices.

SUMMARY OF THE INVENTION

The variably mountable profile bar according to the invention for use as a column, boom, cross member, strut, or the like for devices, has the advantage over the prior art that the disadvantages of the profile bars known from the prior art are eliminated. The profile bar is very rigid while being relatively slight in structural size. It is very straight and consequently permits a precise alignment of components in relation to one another.

It is also possible for there to be a universal line of stands with ideal properties for special purpose machine engineering, which makes it possible for there to be variable, parameter-controlled subassemblies that can be used universally. This achieves a high degree of savings in construction costs. Consequently, a building block system is produced with parts that can be combined with one another. The profile bar can also be used in wet operation. It requires less tabletop space.

Other advantages and advantageous modifications of the profile bar according to the invention ensue from the dependent claims and the description.

BRIEF DESCRIPTION OF THE DRAWINGS an exemplary embodiment of the invention is shown in the drawings and will be explained in detail below.

DESCRIPTION OF THE PREFERRED EMBODIMENT

Figure 1:
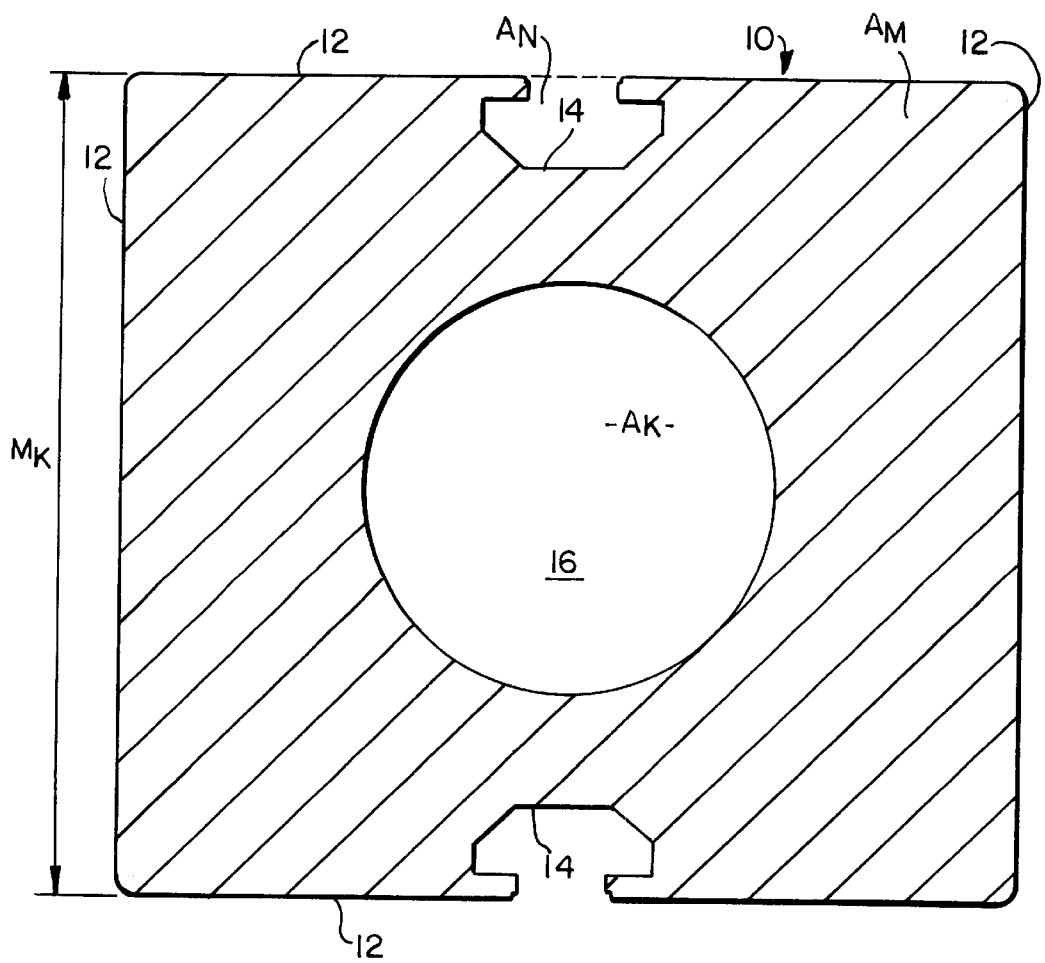
FIG. 1 shows the cross sectional area of a profile bar.

FIG. 1 shows a variably mountable profile bar 10 for use as a column, boom, cross member, strut, or the like for devices, in a section lateral to the longitudinal direction. The profile bar 10 is made of aluminum and is produced in the so-called extrusion process. In a suitable fashion, the outer contour of the profile bar 10 is essentially rectangular; in the current exemplary embodiment, it is embodied as square. A particularly advantageous edge measure $M_K$ for the profile bar 10 is 80 mm.

Along two of its opposing side surfaces 12, the profile bar 10 has an anchoring groove 14, which grooves are known in and of themselves and are disposed in the center of the side surfaces 12. Anchoring grooves 14 offer a hold for sliding blocks, hammer nuts, and the like in order to provide mounted components with a secure hold. One or more anchoring grooves 14 can be also be respectively embodied in more or less than the two side surfaces 12. Two opposing anchoring grooves 14, however, are very useful since they are sufficient for conventional fastenings. This also leaves more smooth surfaces, which is required for use in clean rooms, for example. The width of the groove throat is 8 mm, the groove depth is 8.85 mm, and the width of the undercut is 16 mm, wherein the undercut is beveled at the bottom of the groove. As a result of this advantageous groove size, an anchoring groove 14 has a groove cross sectional area $A_N$ of approx. 112 mm$^2$; however, other groove cross sectional areas $A_N$ are also possible. Components such as signs can easily be fastened to the anchoring grooves 14.

In the longitudinal direction, the profile bar 10 also has a central, round, hollow channel 16 to accommodate power lines, for example electrical or pneumatic lines. If necessary, more than one hollow channel 16 can also be provided. The channel 16 suitably has a diameter of 40 mm, which results in a channel cross sectional area $A_K$ of approx. 1256 mm$^2$. It is also very useful if it has a diameter of 45 mm. On the whole, a diameter range from 30 mm to 50 mm has turned out to be favorable.

For the remaining material of the profile bar 10, there is a material cross sectional area $A_M$ of approx. 4665 mm$^2$. It is essential in the profile bar 10 that at least in sections, the ratio of the groove cross sectional area $A_N$ and the channel cross sectional area $A_K$ to the material cross sectional area $A_M$ is between 0.1 and 0.8. A better ratio is between 0.2 and 0.6. A particularly advantageous ratio has turned out to be between 0.2 or 0.3, in particular 0.25, and 0.4. These data are related to the rough, unprocessed profile bar 10; that is, when the profile bar 10 has been manufactured. Consequently, the current profile bar 10, as an aluminum part, has a bending rigidity that corresponds to that of a steel pipe with an edge size of 60 mm and a wall thickness of 5 mm. The bending rigidity of the profile bar 10 with the edge size of 80 mm also corresponds to approx. 90% of the bending rigidity of a solid profile bar with the same edge size. By means of this design, the profile bar 10 can be used in a particularly variable, but nevertheless inexpensive manner in special purpose machine engineering. The profile bar 10 can be clamped to a processing machine. Then precise processing can be carried out in one clamping. This is not possible with conventional profile bars made of aluminum since the ratio of the areas of the hollow channels to the area of the material is too high and a profile bar is thus too weak.

Figure 2:
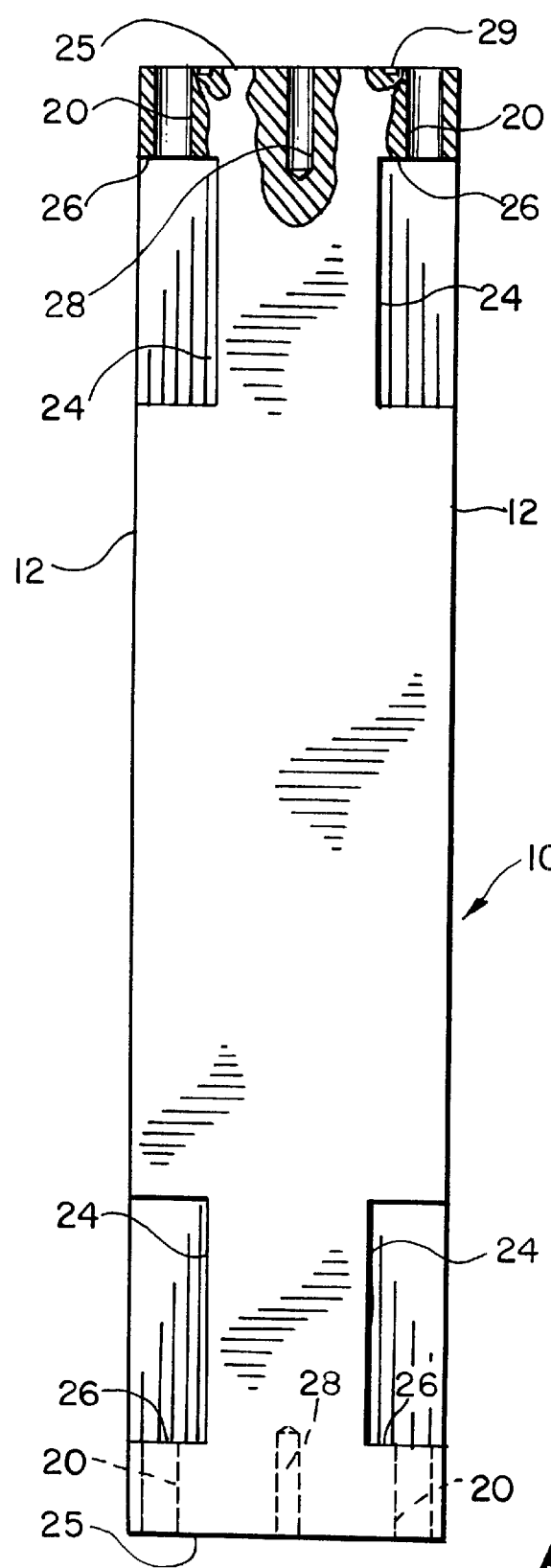
FIG. 2 is a side view of the profile bar according to FIG. 1
Figure 3:
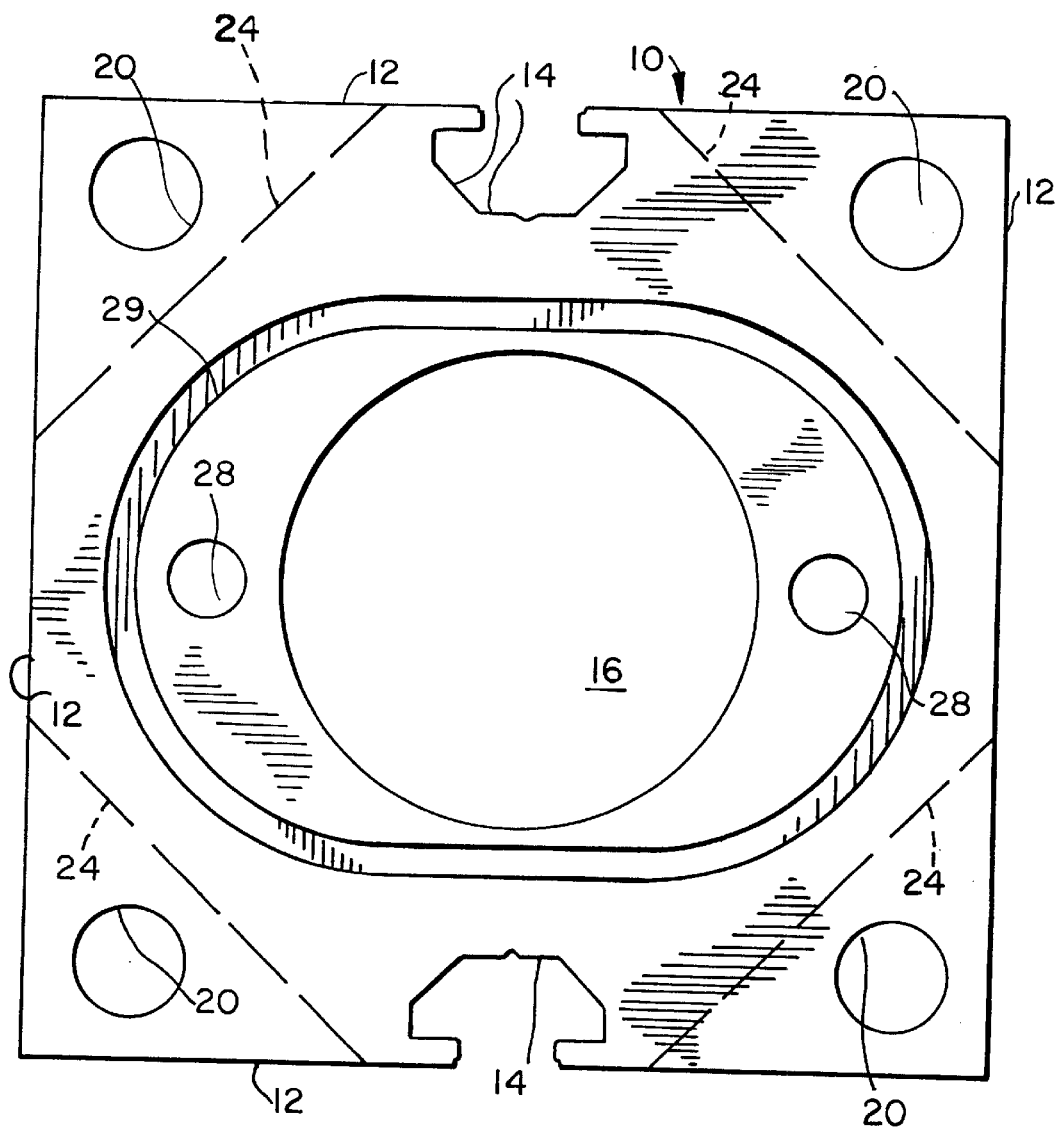
FIG. 3 shows an end face of the profile bar.

As can be inferred from FIGS. 2 and 3, in the corner regions 18, the profile bar 10 has bores 20 which are for the attachment of screws and extend from the end faces 25 of the profile bar 10. The distance of the bores 20 from the central axis is approx. 32 mm. The diameter in the current exemplary embodiment is 9 mm so that screws with an M8 thread can pass through.

In the corner regions 18 of the end regions 22 of the profile bar 10, there are recesses 24 which adjoin the bores 20 and extend at an angle of 45° in relation to the side surfaces 12. The recesses 24 are embodied in such a way that the bores 20 are accessible not only from the end faces 25 and that enough material remains so that flange-like components can be placed against the end faces 25 of the profile bar 10. As a result, screws can be simply inserted into the bores 20 and tightened, which allows other components to be easily and quickly attached. The recesses 24 are advantageously provided with support faces 26 for screw heads. Covering caps for the recesses 24 can also be provided.

It can also be inferred from FIG. 3 that in the end faces 25 of the profile bar 10, bores 28 can be embodied for pins with a diameter of 6 mm, for example. This permits the profile bar 10 to be aligned very precisely in relation to other components, as a result of which it is well suited for precision tasks. These bores 28 for pins can be realized only because of the favorable ratio of the sum of the groove cross sectional area $A_N$ and the channel cross sectional area $A_K$ to the remaining material cross sectional area $A_M$. As a result, it is also possible to finish the bores 28 and also the bores 20—for example by means of reboring—since there is sufficient material present around the bores 20, 28. Likewise due to the above-mentioned ratio, an annular groove 29 for a sealing ring can be embodied in the end face 25. As a result, a sealing action can be achieved without additional components, such as a flange plate with a seal.

Figure 4:
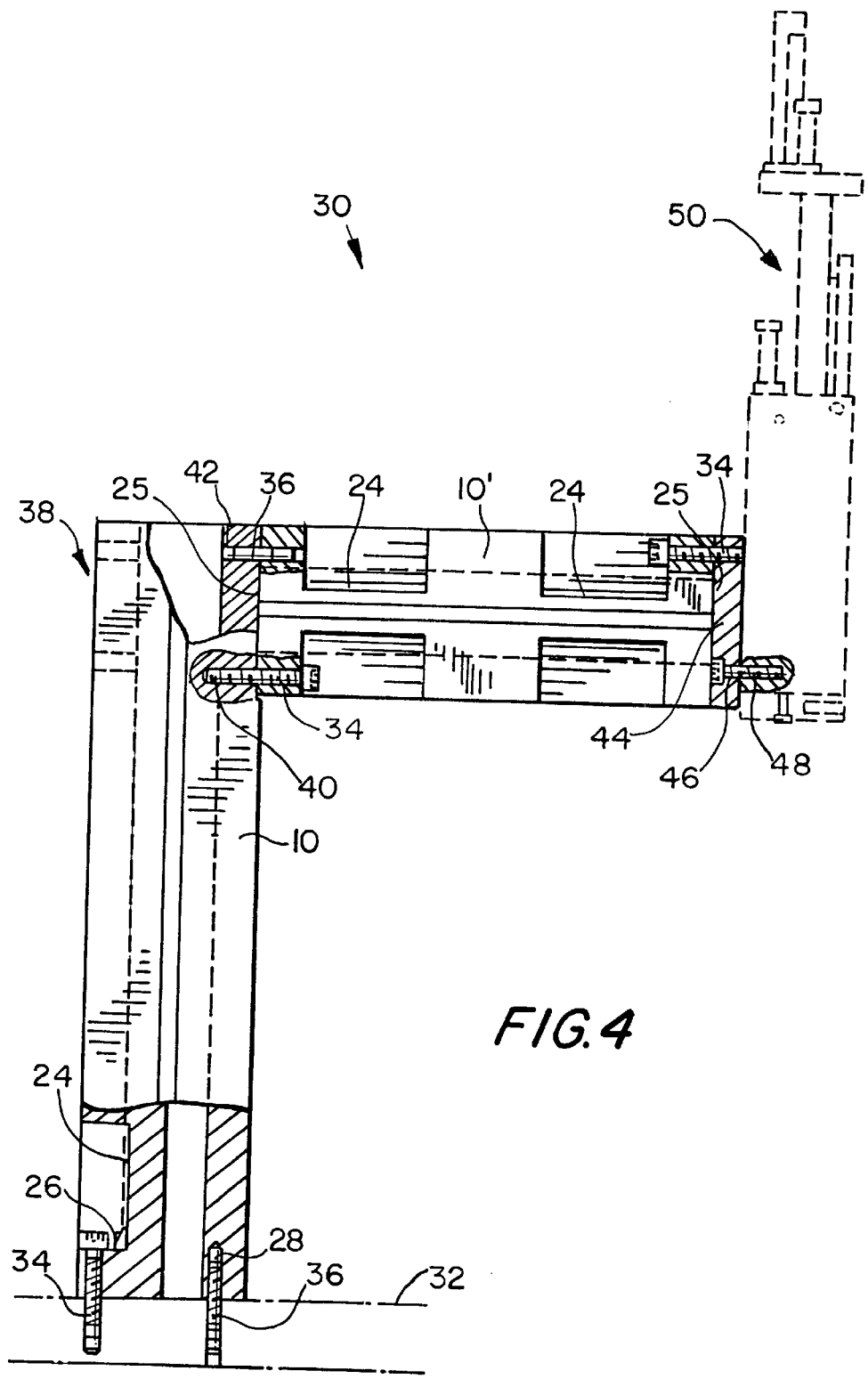
FIG. 4 shows a device

FIG. 4 shows a device 30 which has two profile bars 10, 10'. The first profile bar 10 is used as a column for the device 30 and is attached to a plate 32. The attachment in this instance takes place by means of four screws 32, which are guided via the recesses 24 through the bores 20, and are screwed into the plate 32. With two pins 36, which are disposed in the bores 28 and corresponding bores in the plate 32, the device 30 can be aligned very precisely in relation to the plate 32.

An end face 25 of the second profile bar 10' is disposed at the end 38 of the profile bar 10 remote from the plate 32, against one of its side surfaces 12. The attachment is likewise produced by means of screws 34 and pins 36, wherein the screws 34 are guided through recesses 24. Due to the ratio of the groove cross sectional area $A_N$ and the channel cross sectional area $A_K$ to the material cross sectional area $A_M$, sufficient material remains so that threaded bores 40 for the screws 32 and/or bores 42 for the pins 36 can be embodied in this solid material, lateral to the longitudinal direction of the profile bar 10. Consequently, a number of uninterrupted thread revolutions are produced for the threaded bores 40. The screws 34 therefore have a very good hold. The bores 42 are continuous, as a result of which the pins 36 disposed in them are disposed in the bores 28 over their entire length.

A flange plate 44 is disposed at the end face 25 of the second profile bar 10' remote from the first profile bar 10. This flange plate is attached to the second profile bar 10' with screws 34 and pins 36, not shown, in the same way as the plate 32. A linear module 50 is fastened in the flange plate 44 by means of screws 48 guided through bores 46. Pins 36, which are likewise not shown, are provided in order to position the linear module 50.

By correspondingly changing the bores 46 or the bore pattern of the flange plate 44, a different linear module that is not identical to the linear module 50 can be used. The only thing this requires is the use of a different flange plate. The remaining components, particularly the profile bars 10, 10', remain the same. It is therefore possible, using the profile bar 10, to produce a building block system that is particularly well suited for special purpose machine engineering, which requires precise processing.

In addition to the utilization as a column and boom described in detail above, the profile bar 10 can also be used as a cross member or strut between two components of a modified device 30; e.g. profile bars 10 can be fastened for this purpose to both end faces 25 of the profile bar 10'. The profile bar 10, 10' can thus be used in a highly variable manner since any component can be attached in a stable manner to its end faces 25 and to its side surfaces 12 by means of bores 20 and 40, as well as to its anchoring grooves 14.

What is claimed is:

1. A variable mountable profile bar for use as a column, boom, cross member, strut and another device, made of aluminum, comprising at least one anchoring groove with a groove cross sectional area along at least one slide surface; at least one hollow channel with a channel cross-sectional area in a longitudinal direction of the profile bar; and a material with a cross sectional area at least in sections a ratio of the groove cross sectional area and the channel cross sectional area together with the material cross sectional area being 0.1 and 0.8; corner regions including at least one end region with bores for placement of screws and extending from end faces of the profile bar, said at least one end region in said corner regions being provided with recesses so that said recesses join said bores extending from the end faces, so that said bores in said corner regions are accessible, said recesses having support faces for screw heads.

2. The variable mountable profile bar as defined in claim 1, wherein the ratio of the groove cross sectional area and the channel cross sectional area together with the material cross sectional area is between 0.2 and 0.6.

3. The variable mountable profile bar as defined in claim 1, wherein the ratio of the groove cross sectional area and the channel cross sectional area together with the material cross sectional area is between 0.25 and 0.4.

4. The variable mountable profile bar as defined in claim 1, wherein the profile bar has an essentially rectangular outer contour.

5. The variable mountable profile bar as defined in claim 1, wherein the profile bar has an essentially square outer contour.

6. The variable mountable profile bar as defined in claim 1, wherein the profile bar has two opposing anchoring grooves.

7. The variable mountable profile bar as defined in claim 1, wherein the end faces are provided with bores for pins.

8. The variable mountable profile bar as defined in claim 1, and further comprising components which are placeable against the end faces.

9. A variable mountable profile bar for use as a column, boom, cross member, strut and another device, made of aluminum, comprising at least one anchoring groove with a groove cross sectional area along at least one side surface;

at least one hollow channel with a channel cross sectional area at least in sections ratio of the groove cross sectional area and the channel cross sectional area together with the material cross sectional area being between 0.1 and 0.8; and an angular groove for a sealing ring in at least one end face of the profile bar.

10. The variable mountable profile bar as defined in claim 9, wherein the ratio of the groove cross sectional area and the channel cross sectional area together with the material cross sectional area is between 0.2 and 0.6.

11. The variable mountable profile bar as defined in claim 9, wherein the ratio of the groove cross sectional area and the channel cross sectional area together with the material cross sectional area is between 0.25 and 0.4.

12. The variable mountable profile bar as defined in claim 9, wherein the profile bar has an essentially rectangular outer contour.

13. The variable mountable profile as defined in claim 9, wherein the profile bar has an essentially outer contour.

14. The variable mountable profile bar as defined in claim 9, wherein the profile bar has two opposing anchoring grooves.

15. The variable mountable profile bar as defined in claim 9, wherein the end faces are provided with bores for pins.

16. The variable mountable profile bar as defined in claim 9, and further comprising components which are placeable against the end faces.

\* \* \* \* \*